United States Patent
Mishra et al.

(10) Patent No.: US 12,079,334 B2
(45) Date of Patent: *Sep. 3, 2024

(54) HARDWARE TROJAN DETECTION USING REINFORCEMENT LEARNING

(71) Applicant: University of Florida Research Foundation, Inc., Gainesville, FL (US)

(72) Inventors: Prabhat Kumar Mishra, Gainesville, FL (US); Zhixin Pan, Gainesville, FL (US)

(73) Assignee: University of Florida Research Foundation, Inc., Gainesville, FL (US)

( * ) Notice: Subject to any disclaimer, the term of this patent is extended or adjusted under 35 U.S.C. 154(b) by 370 days.

This patent is subject to a terminal disclaimer.

(21) Appl. No.: 17/543,940

(22) Filed: Dec. 7, 2021

(65) Prior Publication Data
US 2022/0188415 A1 Jun. 16, 2022

Related U.S. Application Data

(60) Provisional application No. 63/125,606, filed on Dec. 15, 2020.

(51) Int. Cl.
*G06F 21/55* (2013.01)
*G06N 20/00* (2019.01)

(52) U.S. Cl.
CPC ........... *G06F 21/554* (2013.01); *G06N 20/00* (2019.01); *G06F 2221/034* (2013.01)

(58) Field of Classification Search
CPC ............. G06F 21/554; G06F 2221/034; G06F 21/556; G06N 20/00; G06N 3/006; G06N 7/01
See application file for complete search history.

(56) References Cited

U.S. PATENT DOCUMENTS 11,531,577 B1 * 12/2022 Bernat ................ G06F 11/3452
11,586,728 B2 * 2/2023 Schat .................... G06F 11/349
(Continued)

OTHER PUBLICATIONS

Konstantinos et al, Machine Learning for Hardware Trojan Detection: A Review, 2019 (Year: 2019).*
(Continued)

*Primary Examiner* — Javier O Guzman
(74) *Attorney, Agent, or Firm* — Thomas | Horstemeyer, LLP

(57) ABSTRACT

The present disclosure provides systems and methods for test pattern generation to detect a hardware Trojan. One such method includes determining, by a computing device, a set of initial test patterns to activate the hardware Trojan within an integrated circuit design; evaluating nodes of the integrated circuit design and assigning a rareness attribute value and a testability attribute value associated with respective nodes of the integrated circuit design; and generating a set of additional test patterns to activate the hardware Trojan within the integrated circuit design using a reinforcement learning model. The set of initial test patterns is applied as an input along with rareness attribute values and testability attribute values associated with the nodes of the integrated circuit, and the reinforcement learning model is trained with a stochastic learning scheme to identify optimal test patterns for triggering nodes of the integrated circuit design.

20 Claims, 11 Drawing Sheets

(56) References Cited

U.S. PATENT DOCUMENTS

| | | | | |
|---|---|---|---|---|
| 2019/0318083 | A1* | 10/2019 | Schat | G01R 31/31707 |
| 2020/0104485 | A1* | 4/2020 | Crouch | G06F 21/552 |
| 2021/0103681 | A1* | 4/2021 | Das | H03K 17/687 |
| 2021/0342690 | A1* | 11/2021 | Wang | H04L 63/1441 |
| 2022/0191222 | A1* | 6/2022 | Zifroni | H04L 63/0236 |
| 2022/0291986 | A1* | 9/2022 | Klein | G06F 3/0604 |

OTHER PUBLICATIONS

Reshma et al, Hardware Trojan Detection Using Deep Learning Technique, 2019 (Year: 2019).*

Alif Ahmed et al. "Scalable Hardware Trojan Activation by Interleaving Concrete Simulation and Symbolic Execution". IEEE International Test Conference. pp. 1-10. 2018.

Rajat Subhra Chakraborty et al. "MERO: A Statistical Approach for Hardware Trojan Detection". 15 pages. 2009.

Jonathan Cruz et al. "Hardware Trojan Detection using ATPG and Model Checking". IEEE Computer Society. 31st International Conference on VLSI Design and 17 International Conference on Embedded Systems. pp. 91-96. 2018.

Yuanwen Huang et al. "Scalable Test Generation for Trojan Detection Using Side Channel Analysis". IEEE Transactions on Information Forensics And Security. vol. 13. No. 10, pp. 2746-2760. Nov. 2018.

Yangdi Lyu et al. "Automated Trigger Activation by Repeated Maximal Clique Sampling". IEEE 25th Asia and South Pacific Design Automation Conference (ASP-DAC) pp. 482-487. 2020.

Hassan Salmani. "COTD: Reference-Free Hardware Trojan Detection and Recovery Based on Controllability and Observability in Gate-Level Netlist". IEEE Transactions On Information Forensics And Security. vol. 12, No. 2, pp. 338-350. Feb. 2017.

Hassan Salmani et al. "A Novel Technique for Improving Hardware Trojan Detection and Reducing Trojan Activation Time". IEEE Transactions On Very Large Scale Integration (VLSI) Systems. vol. 20, No. 1, pp. 112-125. Jan. 2012.

Mohammad Tehranipoor et al. "A Survey of Hardware Trojan Taxonomy and Detection". IEEE Design & Test of Computers. pp. 10-25. 2010.

Adam Waksman et al. FANCI: Identification of Stealthy Malicious Logic Using Boolean Functional Analysis. Proceedings of the ACM SIGSAC Conference on Computer & Communications Security. pp. 1-10. 2013.

Tony F. Wu et al. "TPAD: Hardware Trojan Prevention and Detection for Trusted Integrated Circuits". IEEE Transactions On Computer-Aided Design Of Integrated And Systems. vol. 35, No. 4, pp. 521-534. Apr. 2016.

Sami Khairy et al. "Reinforcement-Learning-Based Variational Quantum Circuits Optimization for Combinatorial Problems". arXiv preprint. pp. 1-7. Nov. 2019.

Henry J. Kelley. "Gradient Theory of Optimal Flight Paths". ARS Journal. pp. 947-954. Oct. 1960.

Anna Goldie et al. "Placement Optimization with Deep Reinforcement Learning". International Symposium on Physical Design. 5 pages. 2020.

Leonardo De Moura et al. "Z3: An Efficient SMT Solver". International Conference on Tools and Algorithms for the Construction and Analysis of Systems. pp. 337-340. 2008.

* cited by examiner

| Logic gates | Testability Measure |
|---|---|
| AND gate with inputs a, b and output c | $CC0(c) = min\{CC0(a), CC0(b)\} + 1$<br>$CC1(c) = CC1(a) + CC1(b) + 1$<br>$CO(a) = CO(c) + CC1(b) + 1$ |
| OR gate with inputs a, b and output c | $CC0(c) = CC0(a) + CC0(b) + 1$<br>$CC1(c) = min\{CC1(a), CC1(b)\} + 1$<br>$CO(a) = CO(c) + CC0(b) + 1$ |
| NOT gate with input a and output b | $CC0(a) = CC1(b) + 1$<br>$CC1(a) = CC0(b) + 1$<br>$CO(a) = CO(b) + 1$ |

FIG. 5

Table 1: Comparison of trigger coverage with existing approaches

| Benchmarks | # Signals | MERO [7] | | TARMAC [1] | | | Proposed Approach (TGRL) | | |
|---|---|---|---|---|---|---|---|---|---|
| | | # Tests | Trigger-Cov(%) | # Tests | Trigger-Cov(%) | # Tests | Trigger-Cov(%) | improv./MERO(%) | improv./TARMAC(%) |
| c2670 | 2747 | 6820 | 33.1 | 6820 | 100 | 6820 | 100 | 66.9 | 0 |
| c5315 | 3358 | 9232 | 54.3 | 9232 | 84.6 | 9232 | 100 | 45.7 | 15.4 |
| c6288 | 7744 | 5044 | 68.9 | 5044 | 86.1 | 5044 | 100 | 33.1 | 13.9 |
| c7552 | 7580 | 14914 | 4.9 | 14914 | 58.7 | 14914 | 97.3 | 92.4 | 38.6 |
| s13207 | 8772 | 44534 | 2.6 | 44534 | 84.2 | 44534 | 93.4 | 90.8 | 9.2 |
| s15850 | 10470 | 39101 | 2.2 | 39101 | 66.3 | 39101 | 88.5 | 86.3 | 22.2 |
| s35932 | 12204 | 34041 | 8.6 | 34041 | 91.5 | 34041 | 93.7 | 85.1 | 2.2 |
| Average | 7838 | 21955 | 24.99 | 21955 | 81.62 | 21955 | 96.12 | 77.13 | 14.5 |

FIG. 7A

Table 2: Comparison of Test Generation Time (in seconds).

| Design | MERO | TARMAC | TGRL | MERO/TGRL | TARMAC/TGRL |
|---|---|---|---|---|---|
| c2670 | 1149 | 301 | 74 | 15.52x | 4.06x |
| c5315 | 3791 | 643 | 126 | 30.08x | 5.11x |
| c6288 | 826 | 666 | 108 | 7.64x | 6.16x |
| c7552 | 7423 | 2809 | 169 | 43.92x | 16.62x |
| s13207 | 16508 | 6022 | 1328 | 12.4x | 4.53x |
| s15850 | 16429 | 12580 | 1204 | 13.64x | 10.44x |
| s35932 | 53171 | 23446 | 4092 | 12.99x | 5.72x |
| Average | 14185 | 6638 | 1014 | 14.1x | 6.54x |

FIG. 7B

HARDWARE TROJAN DETECTION USING REINFORCEMENT LEARNING

CROSS-REFERENCE TO RELATED APPLICATION

This application claims priority to U.S. provisional application entitled, "Hardware Trojan Detection Using Reinforcement Learning," having Ser. No. 63/125,606, filed Dec. 15, 2020, which is entirely incorporated herein by reference.

STATEMENT REGARDING FEDERALLY SPONSORED RESEARCH OR DEVELOPMENT

This invention was made with government support under 1908131 awarded by The National Science Foundation. The government has certain rights in the invention.

BACKGROUND

Due to the globalized semiconductor supply chain, there is an increasing risk of exposing System-on-Chip (SoC) designs to malicious implants, popularly known as hardware Trojans. Unfortunately, a traditional simulation-based validation using millions of test vectors is unsuitable for detecting stealthy Trojans with extremely rare trigger conditions due to the exponential input space complexity of modern SoCs. Thus, there is a critical need to develop efficient Trojan detection techniques to ensure trustworthy SoCs. While there are promising test generation approaches, they have serious limitations in terms of scalability and detection accuracy.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

FIG. 5 shows a computation formula of Sandia Controllability/Observability Analysis Program (SCOAP) testability measurement for fundamental logic gates in accordance with the present disclosure.

FIG. 7A presents a table (Table 1) showing a comparison of trigger coverage between state-of-the-art methods and an exemplary Test Generation technique for Trojan detection using Reinforcement Learning (TGRL) in accordance with embodiments of the present disclosure.

FIG. 7B presents a table (Table 2) showing a comparison of test generation times between state-of-the-art methods and an exemplary Test Generation technique for Trojan detection using Reinforcement Learning (TGRL) in accordance with embodiments of the present disclosure.

DETAILED DESCRIPTION

The present disclosure describes various embodiments of systems, apparatuses, and methods of hardware Trojan detection using reinforcement learning. In various embodiments, a novel logic testing framework for Trojan detection is implemented using an effective combination of testability analysis and reinforcement learning. Specifically, this technology utilizes both controllability and observability analysis along with rareness of signals to significantly improve trigger coverage and makes use of reinforcement learning to considerably reduce the test generation time without sacrificing test quality. Experimental results demonstrate that an exemplary approach, in accordance with the present disclosure, can drastically improve both trigger coverage (14.5% on average) and test generation time (6.5 times on average) compared to state-of-the-art techniques.

Figure 1:
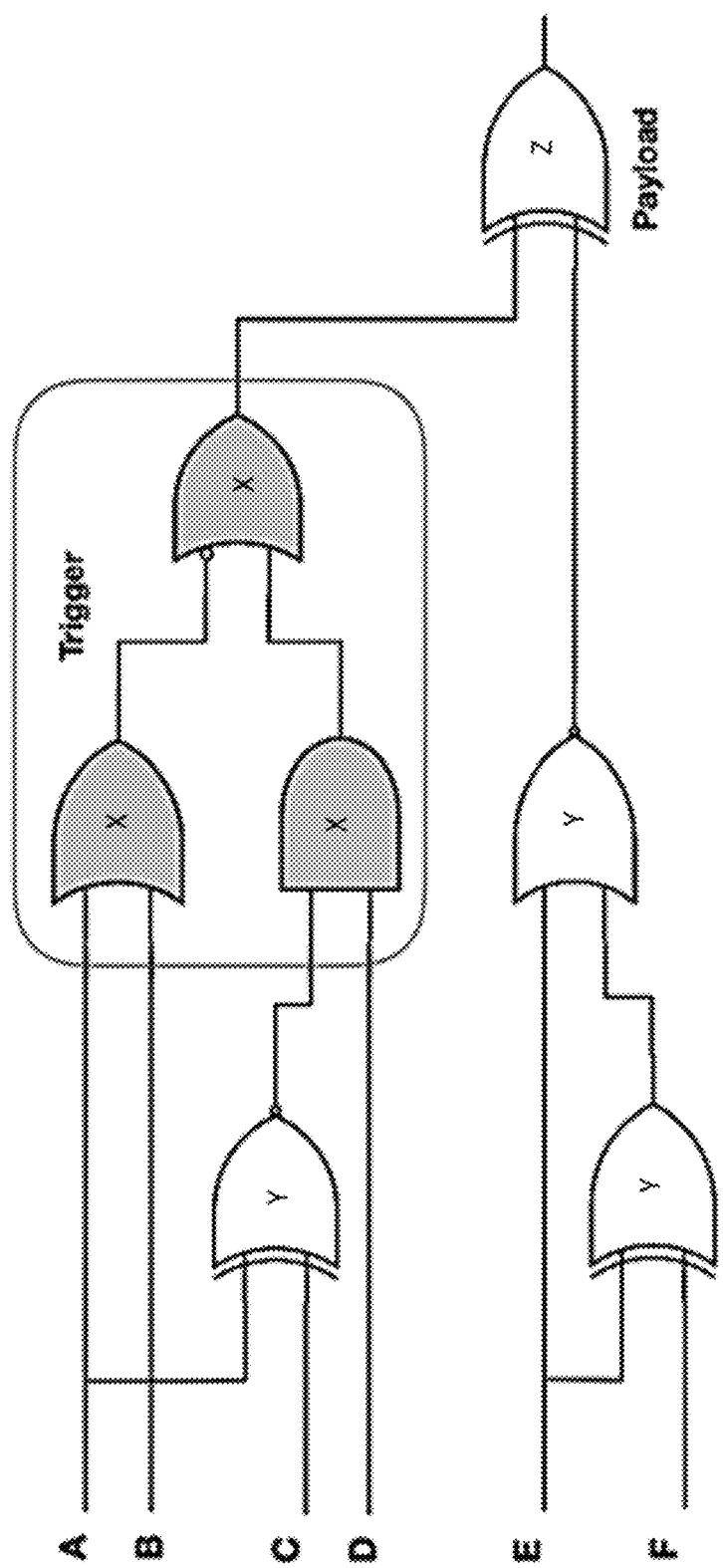
FIG. 1 shows an example hardware Trojan circuit in accordance with the present disclosure.

As an overview, a vast majority of semiconductor companies rely on the global supply chain to reduce design cost and meet time-to-market deadlines. The benefit of globalization is accompanied by the cost of security concerns. For example, a typical automotive System-on-Chip (SoC) includes about 100 Intellectual Property (IP) cores, some of which may come from potentially untrusted third-party suppliers, and an attacker may be able to introduce malicious implants in one of these third-party IPs. In general, a hardware Trojan (HT) is a malicious modification of the target integrated circuit (IC) with two critical parts: trigger and payload. The trigger is typically created using a combination of rare events (such as rare signals or rare transitions) to stay hidden during normal execution, and the payload represents the malicious impact. Accordingly, when the trigger is activated, the payload enables the malicious activity. For example, FIG. 1 depicts an example Hardware Trojan (HT) circuit. In the figure, the HT is constructed by trigger logic (shown as being shaded and marked with an "X"), the gates of the original design are shown marked with an "Y", and the payload is shown marked with a "Z." Accordingly, once the trigger condition is satisfied and the output of the trigger logic is true, the output of the payload (XOR gate marked with a "Z") will invert the expected output, which can commonly result in information leakage or erroneous execution. Due to the stealthy nature of Trojans, it is infeasible to detect them using traditional functional validation methods and it is vital to detect HTs to enable trustworthy computing using modern SoCs.

There have been many promising research efforts for Trojan detection, which can be broadly classified into two categories: side-channel analysis and simulation-based validation (logic testing). Side-channel analysis focuses on the difference in side-channel signatures (such as power, path delay, etc.) between the expected (golden specification) and actual (Trojan-inserted implementation) values. A major drawback in side-channel analysis is that it is difficult to detect the negligible side-channel difference caused by a small Trojan (e.g., few gates in a multi-million gate design), since the difference can easily hide in process variation and environmental noise. In contrast, logic testing is robust against process variation and noise margins. However, it is a fundamental challenge to activate an extremely rare trigger without trying all possible input sequences. Due to exponential input space complexity, traditional logic testing is not suitable for Trojan detection in large designs. For example, existing logic testing based Trojan detection approaches have two fundamental limitations: high computation complexity (long test generation time) and low Trojan detection accuracy (low trigger coverage).

The present disclosure presents an efficient logic testing approach for HT detection that addresses the above two challenges. Accordingly, various embodiments of the present disclosure utilize a stochastic reinforcement learning framework to enable fast and automated generation of effective tests. In contrast, existing logic testing approaches suffer from high computation complexity due to the fact that they require continuously flipping bits of test vectors in an ad-hoc manner to maximize the number of triggered rare activities. Further, existing approaches provide poor trigger coverage, since they only focus on rare signals. Diversely, in various embodiments, an exemplary approach of the present disclosure considers both rareness and the testability of signals using a combination of Sandia Controllability/Observability Analysis Program (SCOAP) measurement and dynamic simulation, which can significantly improve the coverage of suspicious nodes with high stability.

Unlike previous works that focus on rare signals, systems and methods of the present disclosure exploit the controllability and observability of signals. As a result, the generated test patterns can maximize the trigger coverage in suspicious regions. In addition, such systems and methods utilize reinforcement learning to find profitable test patterns to drastically reduce the test generation complexity. Extensive evaluation shows significant improvement in both trigger coverage (14.5% on average) and test generation time (6.45× on average) compared to state-of-the-art approaches.

Figure 2:
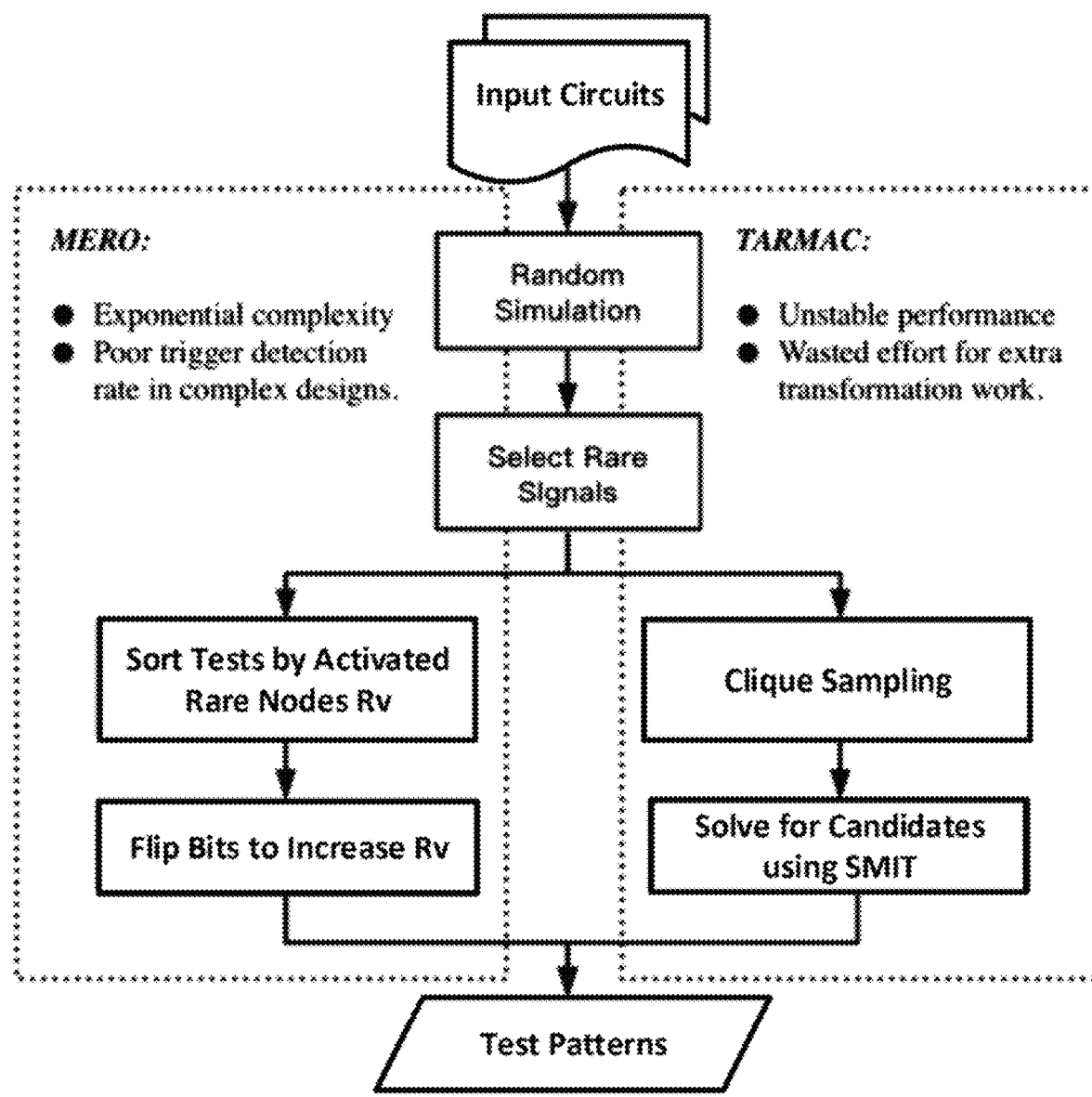
FIG. 2 shows an overview of state-of-the-art logic testing techniques for MERO and TARMAC in accordance with the present disclosure.

The basic idea of logic testing for Trojan detection is to generate test patterns that are likely to activate the trigger conditions of a hardware Trojan. In early days, random test generation was widely explored in industry due to its simplicity. However, there is no guarantee for activating stealthy Trojans using millions of random or constrained-random tests. MERO proposed a statistical test generation scheme, which adopts the N-detect idea to achieve better coverage. The heuristic behind this approach is that if all rare signals are activated at least N times, it is likely to activate the rare trigger conditions when N is sufficiently large. The left side of FIG. 2 shows an overview of MERO, in which the scheme starts with random test generation followed by a brute-force process of flipping bits to increase the number of rare values being satisfied. MERO provides promising results for small benchmarks but introduces long execution time and scalability concerns, making MERO unsuitable for large benchmarks.

To address these issues, Lyu et al. proposed TARMAC as shown on the right side of FIG. 2. Like MERO, TARMAC starts with random simulations to identify rare signals in the netlist. Next, the scheme maps the circuit design to a satisfiability graph and converts the problem of satisfiability into a clique cover problem, where the authors use an SMT (Satisfiability Modulo Theories) solver to generate test patterns for each maximal clique. Although TARMAC performs significantly better than MERO in evaluated benchmarks, its performance is very unstable. This is due to the fact that TARMAC relies on random clique sampling, making its performance dependent on the quality of sampled cliques. For at least these reasons, the existing approaches have inherent limitations in terms of Trojan detection accuracy as well as test generation complexity.

Additionally, there are two major problems that affect the performance of existing efforts: rareness heuristic and test generation complexity. For example, existing methods rely on rareness heuristic for activating HT triggers. However, in a paper by H. Salmani, the author rigorously discussed the inconsistency between rare nodes and trigger nodes. See H. Salmani, "COTD: Reference-Free Hardware Trojan Detection and Recovery Based on Controllability and Observability in Gate-Level Netlist," IEEE Transactions on Information Forensics and Security, Vol. 12, No. 2, pp. 338-350 (2017). According to their experimental evaluation, rare nodes are not necessarily trigger nodes, and vice versa. Reliance on rareness hurts the genuine nodes with a rare attribute (e.g., low switching activity). Moreover, a smart implementation of HT can exploit the mixture of both rare nodes and genuine (non-rare) nodes to obfuscate Trojan detection. In various embodiments, the SCOAP testability measurement is utilized to address this issue.

Existing efforts ignore the interaction between intermediate test vectors and the circuit under test that typically provides useful feedback. For example, if a newly generated test vector significantly decreases the number of triggered rare nodes, then the current parameters of the test generation algorithm will need to get adjusted to avoid wasted effort (time). While this intuition is likely to help in guiding the test generation process, it is ignored by both MERO and TARMAC. For example, MERO generates new test patterns by blindly flipping bits in a brute-force manner using a random strategy, and TARMAC performs random sampling of cliques without taking the feedback into consideration. In a paper by M. Nourian et al., the authors also observed this problem and proposed a genetic algorithm based approach. See M. Nourian et al., "Hardware Trojan Detection Using an Advised Genetic Algorithm Based Logic Testing," JETTA Vol. 34, No. 4, pp. 461-470 (2018). However, their evaluation shows that the genetic algorithm-based approach requires even longer test generation time, which is due to the combined effects of time-consuming training and slow convergence of the genetic algorithm in the later stages of evolution.

Based on the discussion above, an ideal test generation algorithm should address the presented challenges. Accordingly, an exemplary test generation scheme using reinforcement learning effectively fulfills these requirements by exploiting not only the rareness, but also the testability of signals, to improve trigger coverage; and efficiently makes use of feedback in intermediate steps to save test generation time.

Figure 3:
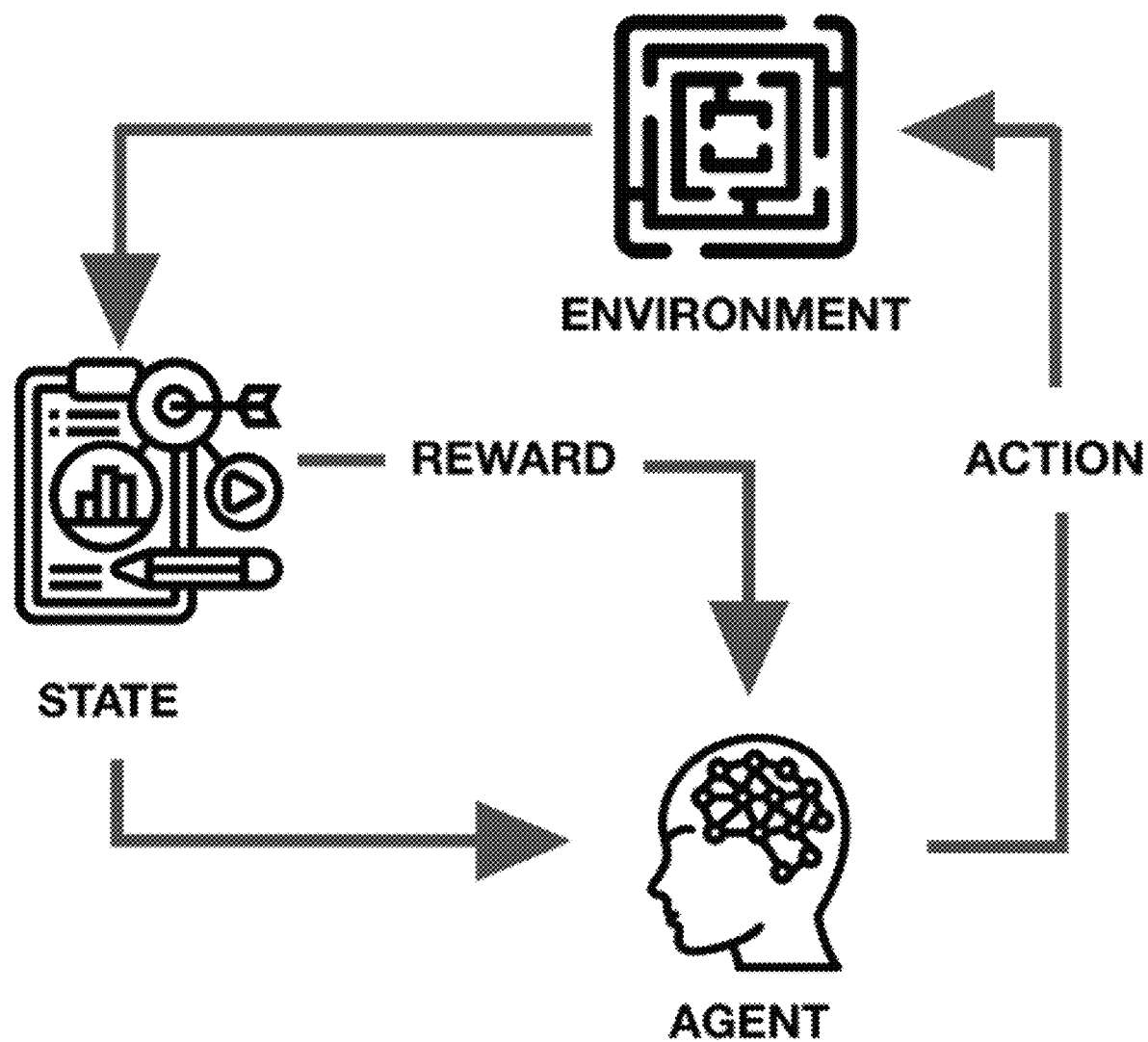
FIG. 3 shows an overview of a reinforcement learning scheme in accordance with the present disclosure.

Reinforcement learning has earned its reputation as an efficient tool, which can solve problems with a large complex searching space. Unlike traditional supervised learning schemes, a training process of reinforcement learning is similar to the nature of human learning. Basically, reinforcement learning works in an adaptive way, as shown in FIG. 3. As such, there are five core adaptive components in reinforcement learning: Agent, Action, Environment, State, and Reward, in which the reinforcement learning starts with the interaction between the Agent and the Environment. At each step, the Agent utilizes its inner strategy to decide the action to take, and the Environment reacts to this action to update the current state, which accordingly provides a Reward value as feedback. By giving a positive reward for beneficial actions and a penalty for inferior choices, the scheme allows the machine to distinguish the merits of certain actions. Moreover, the agent's strategy gets updated after receiving the feedback, and the learning system tries to maximize the possible reward next time. Through continuous trials and rewards, the system gradually adapts itself to make the most beneficial decisions, which quickly leads to a desirable solution.

There are two key obstacles in directly applying this naive framework in test generation for Trojan detection. First, explicitly setting up a proper reward for actions in test generation is difficult. For example, just counting the number of activated rare nodes is not a good metric to assign a reward because an attacker may take multiple dimensions (such as rareness, controllability, observability, etc.) into account while designing a trigger condition. Second, for a given n-bit test pattern, there are $2^n-1$ possible ways to produce variations. Therefore, it is impractical to meet both time and space requirements for dealing with such an exponential action space. However, the present disclosure addresses these challenges in providing a fast and efficient learning algorithm in accordance with embodiments of the present disclosure.

Figure 4:
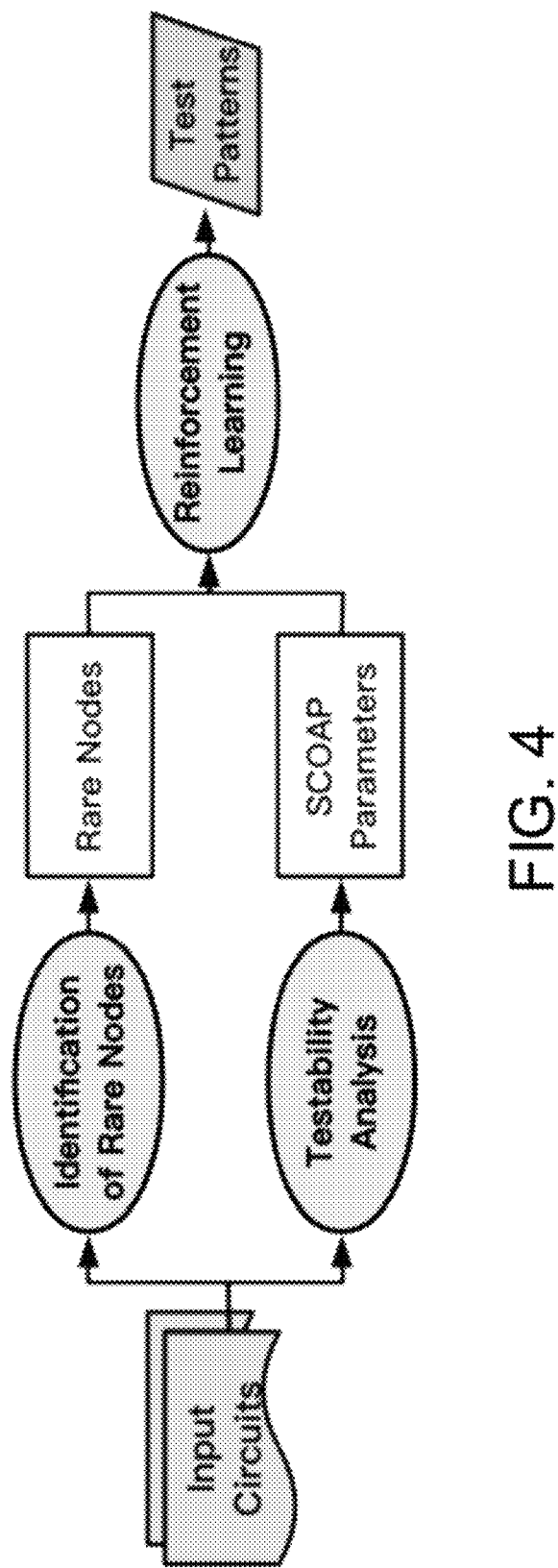
FIG. 4 shows an overview of an exemplary test generation scheme using reinforcement learning (TGRL) in accordance with various embodiments of the present disclosure.

FIG. 4 shows an overview of an exemplary test generation scheme using reinforcement learning (TGRL) in accordance with various embodiments of the present disclosure. For a given circuit design, a combination of static testability analysis and dynamic simulation is applied, where the dynamic simulation provides information on the rare nodes and testability analysis computes SCOAP testability parameters of each node in the circuit. Such intermediate results are fed into a machine learning model as primary inputs, in which reinforcement learning (RL) is utilized as the learning model due to its outstanding potential in efficiently solving problems with a large and complex solution space. The reinforcement learning model is trained with a stochastic learning scheme to generate test vectors, and the RL model continuously improves itself to cover as many suspicious nodes as possible. After sufficient iterations of training, the trained RL model is utilized for automatic test generation. The RL model starts with initial input patterns and continuously generates a set of test patterns until the required number of test patterns are obtained.

Like existing approaches, dynamic simulation of the benchmark can be utilized to identify rare nodes. First, the design can be simulated using a reasonable number of random or constrained-random test patterns. Next, the trace can be analyzed to determine how many times each node (signal) is assigned a value '0' or '1' during the simulation. Finally, signals (with specific values) can be selected as rare nodes that are below a specific threshold. For example, if the output of the NOR gate in FIG. 1 was '0' 96% of the time (i.e. '1' with 4% of the time) during simulation and threshold is 5%, the output of the NOR gate with value '1' will be marked as a rare node. A threshold is considered reasonable if the trigger constructed by the respective rare nodes cannot be covered by a traditional simulation-based validation using millions of random tests. The above process is described in Algorithm1 (below).

Algorithm 1: Identification of Rare Nodes

| | | |
|---|---|---|
| | Input: Design(D), threshold ρ, number of epochs k | |
| | Output: Rare nodes set RN | |
| 1 | repeat | |
| 2 | \| randomSim(D) | |
| 3 | \| for each s ∈ D do | |
| 4 | \| \| if s.val = 1 then s.cnt1 = s.cnt1 + 1 | |
| 5 | \| \| else s.cnt0 = s.cnt0 + 1 | |
| 6 | \| i = i + 1 | |
| 7 | until i < k; | |
| 8 | for each s ∈ D do | |
| 9 | \| if min {s.cnt1, s.cnt0} ≤ ρk then | |
| 10 | \| \| RN = RN ∪ {s} | |

While a majority of existing techniques mainly consider rareness to evaluate suspicious signals, it remains the responsibility of the defender to come up with a more comprehensive measurement. In an exemplary approach, a Sandia Controllability/Observability Analysis Program (SCOAP) is utilized, which takes both controllability and observability attributes of signals into consideration. In essence, controllability indicates an amount of effort required for setting a signal to a specific value, while observability weighs the difficulty of propagating the target signal towards observation points. The testability measurement naturally fits the demand of HT detection from a security perspective. Clearly, signals with low controllability are more likely to be chosen as trigger signals, because low controllability guarantees the difficulty of switching these signals with a limited number of test patterns. Similarly, targeting signals with low observability as payloads are favorable for attackers, since it coincides with HT's clandestine property and avoids them from frequently generating an observable impact on design outputs.

The SCOAP method quantifies the controllability and observability of each signal in the circuit with three numerical values: CC0 (Combinational 0-controllability) corresponding to the number of signals that must be manipulated to set a '0' value for the target; CC1 (Combinational 1-controllability) corresponding to the number of signals that must be manipulated to set a '1' value for the target; and CO (Combinational observability) corresponding to the number of signals that must be manipulated to observe a target value at the primary outputs. The SCOAP computation can be performed in a recursive manner, in which the boundary conditions are the primary inputs (PI) and the primary outputs (PO), where $$CC0(PI)=CC1(PI)=1$$

$$CO)PO)=0$$

This is a straightforward process, since only one manipulation is required for controlling the primary input (itself), while no extra operation is needed for observing the primary output. Next, the circuit can be converted into a directed acyclic graph (DAG) and further levelized by topological sorting. For each gate, the output controllability can be determined by the controllability of its inputs, while the input observability can be determined by the observability of its output and all the other input signals. Accordingly, FIG. 5 shows the computation formula of SCOAP testability measurement for three fundamental logic gates. If we consider the CC1 measurement of the AND gate as an example, both of the input signals a and b should be manipulated as '1' at the same time in order to control the output signal c as '1.' Therefore, we have CC1(c)=CC1(a)+CC1(b)+1, where the '+1' is for counting the level depth. It is worth noting that since the controllability parameters of inputs are necessary for computing the controllability parameters of the output signal, the SCOAP procedure starts from calculating controllability values for all signals in a direction from PI toward PO. Afterwards, the signals' observability is measured in the reverse direction, which is described in Algorithm 2 (below).

| Algorithm 2: Testability Analysis (getSCOAP) |
| --- |
| Input: Design(D) |
| Output: SCOAP Parameters of all nodes in D |
| 1    Transfer design into DAG: G = DAG(D) |
| 2    Topological Sort: G* = topo(G, PI → PO) |
| 3    CC0(PI) = CC1(PI) = 1, CO(PO) = 0 |
| 4    for each gate g ∈ G* do |
| 5        ⌊ g.out.SCOAP = computeCC(g.in.SCOAP, type(g)) |
| 6    G* = reverse(G*) |
| 7    for each gate g ∈ G* do |
| 8        ⌊ g.in.SCOAP = computeCO(g.out.SCOAP, type(g)) |

The task of SCOAP testability analysis can be performed in parallel with the identification of rare signals in the circuit. The computed attributes (SCOAP parameters and rare signal values) can be fed into a reinforcement learning model to fulfill automatic test generation, in accordance with various embodiments of the present disclosure.

In accordance with the present disclosure, for an exemplary learning paradigm, the objects in a test generation task are mapped onto the five components of reinforcement learning. In an exemplary test generation problem, Agent refers to the object interacting with the environment and is chosen as the current test vector under processing & denoted as t. Environment refers to the circuit design, in which the Environment receives the input test vector to produce meaningful results. The Environment is denoted as D. State refers to information presented by the Environment that can be perceived by the user, such as conditions and parameters. The SCOAP parameters and rare signal values of the entire circuit are mapped as State and are encoded by two functions rv and scoap, where rv returns the rare value for a specific signal, and scoap is defined as follows:

$$scoap(s)=|<CO(s),CC(rv(s))>|$$

For a given signal s, CO(s) is the combinational observability of s, and CC(rv(s)) is the combinational controllability corresponding to the rare value of s. The L−1 norm of SCOAP parameters are utilized to measure the synthesized testability of signal s, and the State records the basic information of the interaction between a current test vector and the circuit, which can be further utilized in the reward computation.

Figure 6:
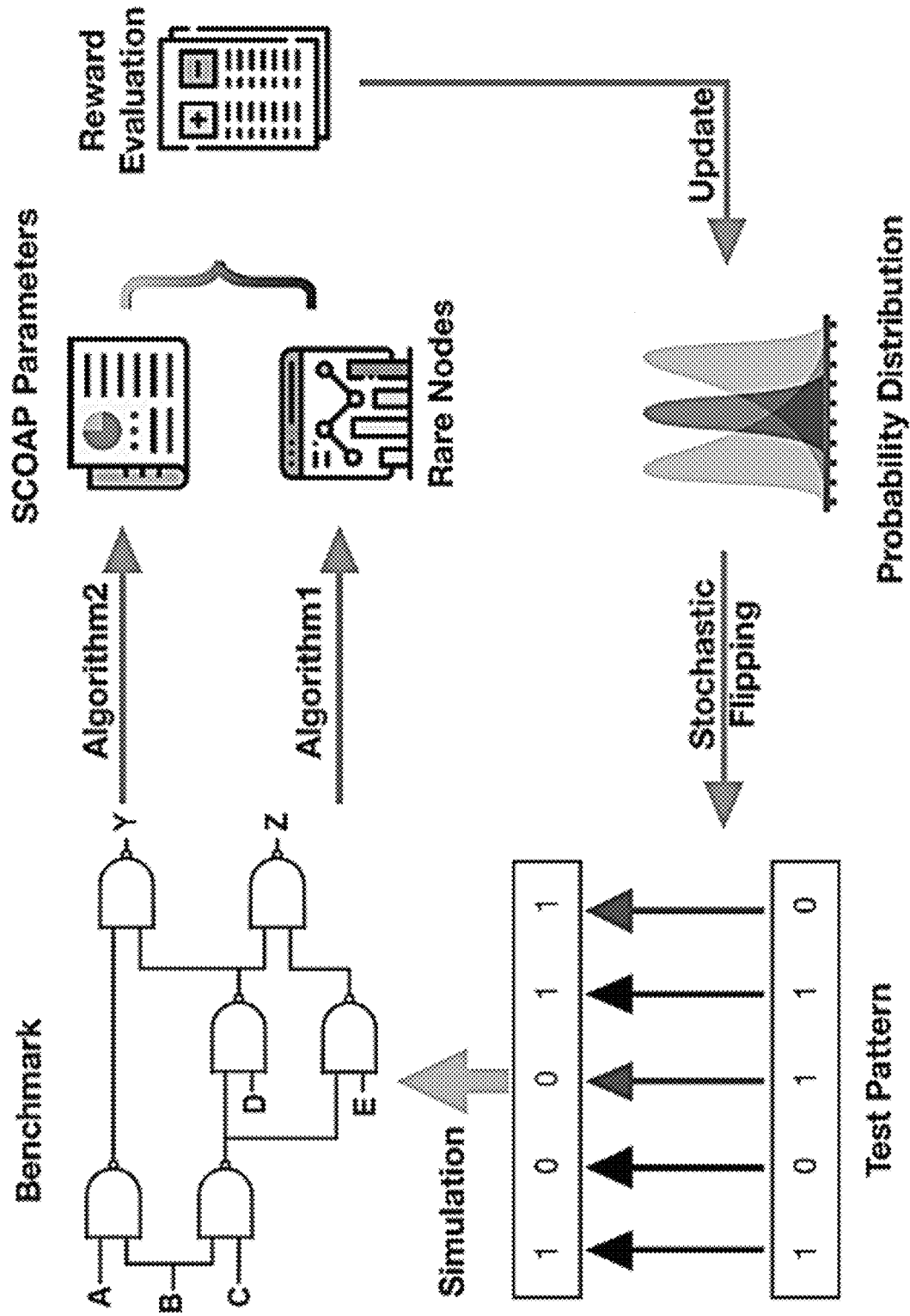
FIG. 6 shows an overview of stochastic reinforcement learning in accordance with the present disclosure.

The Action space includes all possible operations that make changes to the system. For the test generation problem, a natural choice is the total set of possible bit flipping operations. However, in that case, the action space (size) for a vector of length n is $2^n-1$, which is impractical for encoding and manipulation. A stochastic approach can be applied to address this challenge, as described in FIG. 6. In an exemplary approach, for each bit in the current test vector, a probabilistic selection can determine whether to flip the bit or not. In other words, the action is chosen randomly at each step, and the non-deterministic action is not completely arbitrary but determined by the given probability distributions, which guarantees the coverage of all possible flipping operations. This stochastic approach sheds light on drastically reducing the cost for encoding actions, in which the probabilistic selection on each bit is a binary selection, which can be encoded by one floating-point number. Therefore, an n-bit test pattern requires a vector function $P(\theta)=[\theta_1, \theta_2, \ldots, \theta_n]$ to formulate the entire space of probability selection.

In general, a Reward value is the most important feedback information from the Environment that describes the effect of the latest Action. For optimization problems, the Reward often refers to the benefit of performing the current operation. In an exemplary framework, a composite reward evaluation scheme having two components, rare reward and testability reward, is utilized. Given a current test vector t and action space P, the newly generated test vector is denoted as $t_p$=act (t, P). $D(s, t_p)$ is denoted as the value of signal s after applying $t_p$ for D, by which we can further define the reward value R in test generation as follows:

$$R_r(t_p)=\text{size}(\{s|D(s,t_p)=rv(s)\})$$

$$R_t(t_p)=\Sigma scoap(s) \text{ w.r.t } D(s,t_p)=rv(s)$$

$$R(t_p)=R_r(t_p)+\lambda \cdot R_t(t_p)$$

Here, $R_r(t_p)$ is the rare reward, which is based on counting of the number of triggered rare signals, and $R_t(t_p)$ is the testability reward defined as the summation of scoap measurements of corresponding signals. Finally, $\lambda \in R+$ is used as a regularization factor to balance the weight of the two components. The reward value is exploited in the reinforcement learning model to update hyperparameters at each iteration representing the interaction between the 'Agent' and the 'Environment.' Specifically, propagation is applied with the computed reward value to adjust the probability distributions. For example, when a positive reward is obtained, the probability of the corresponding action is increased and vice versa. Accordingly, an exemplary training procedure is presented in Algorithm 3 (below).

| Algorithm 3: Training of Reinforcement Learning Model |
| --- |
| Input: Design(D), Parameter (θ), learning rate (α), number of epochs (k) |
| Output: Optimal Model Parameter θ* |
| 1    Initialize Random test set T = RandomTest( ) |
| 2    Initialize probability distributions P = P(θ) |
| 3    Compute SCOAP parameters (CC0, CC1, CO) = getSCOAP(D) |
| 4    i = j = 0, n = size(T) |
| 5    repeat |
| 6      | Initialize Reward: R = 0 |
| 7      | repeat |
| 8      |    | for each t ∈ T do |
| 9      |    |    | $t_p$ = act(t, P) |
| 10    |    |    | $R_r(t_p)$ = size({s|D(s, $t_p$) = rv(s)}) |
| 11    |    |    | $R_t(t_p)$ = Σ scoap(s) w.r.t D(s, $t_p$) = rv(s) |
| 12    |    |    ⌊ $R(t_p) = R_r(t_p) + \lambda \cdot R_t(t_p)$ R = R + $R(t_p)$ |
| 13    |    | Update parameter: θ = θ + α∇$_\theta$J(R) |
| 14    | until j ≥ n; |
| 15    until i ≥ k; |
| 16    Return θ |

To enable a fair comparison with the existing approaches, an experiment was deployed on the same benchmarks as used in the works of R. Chakraborty et al. and Y. Lyu, et al. from ISCAS-85 and ISCAS-89. See R. Chakraborty et al, "MERO: A Statistical Approach for Hardware Trojan Detection," Cryptographic Hardware and Embedded Systems—CHES 2009, pp396-410 (2009); Yangdi Lyu and Prabhat Mishra, "Automated Trigger Activation by Repeated Maximal Clique Sampling," Asia and South Pacific Design Automation Conference (ASP-DAC), pp. 482-487 (2020). The parameter configuration applied in those papers was also preserved, where the rareness threshold was set to 0.1, and the total number of sampled Trojans was set to 1000. The code for benchmark parsing and identification of rare nodes that was used in the experiment was written in C++17. To perform SCOAP analyses, an open-source Testability Measurement Tool (from https://sourceforge.net/projects/test-abilitymeasurementtool/) was used, and an exemplary reinforcement learning model was conducted on a host machine with Intel i7 3.70 GHz CPU, 32 GB RAM and RTX 2080 256-bit GPU. Python (3.6.7) code using PyTorch (1.2.0) with cudatoolkit (10.0) was chosen to implement the machine learning framework. The training process consisted of 500 epochs, where the learning rate a was initialized as 0.02 at the beginning and lowered to 0.01 after 200 epochs. The subsequent performance results were compared in terms of trigger coverage and test generation time between the following methods: MERO which is a statistical test generation for Trojan detection utilizing multiple excitation of rare occurrences; TARMAC which is a state-of-the-art test generation method for Trojan detection using clique cover; and an exemplary Test Generation technique for Trojan detection using Reinforcement Learning (TGRL) in accordance with embodiments of the present disclosure.

Table 1 (as shown in FIG. 7A) demonstrates the effectiveness of an exemplary TGRL method compared to the state-of-the-art methods. The first column of the table lists the benchmarks. The second column shows the number of signals in the respective designs. The third, fifth, and seventh columns provide the number of tests generated by MERO, TARMAC, and the TGRL approach, respectively. The fourth, sixth, and eighth columns of the table show the trigger coverage using the tests generated by MERO, TARMAC, and TGRL, respectively. The last two columns present the improvement in trigger coverage provided by the TGRL approach compared to the state-of-the-art methods. Clearly, MERO provides decent trigger coverage on small designs such as c6288, while its trigger coverage drastically drops to less than 10% when applied to large designs like s15850. TARMAC provides promising improvement compared with MERO, but we can observe that it does not have a consistent outcome.

Figure 8A:
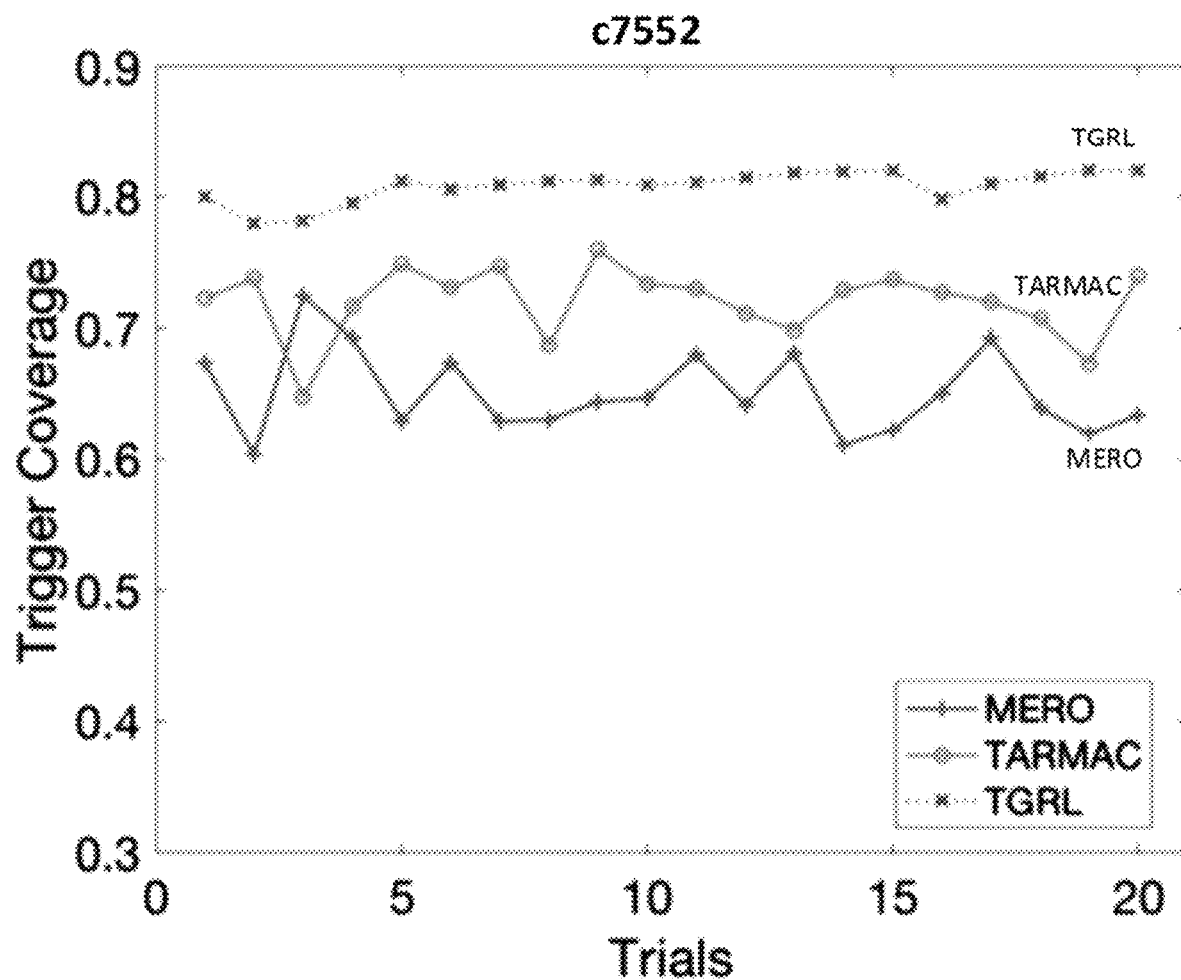
FIGS. 8A and 8B show trigger coverage variation using c7552 and s15850 benchmarks amongst state-of-the-art methods and an exemplary Test Generation technique for Trojan detection using Reinforcement Learning (TGRL) in accordance with various embodiments of the present disclosure.
Figure 8B:
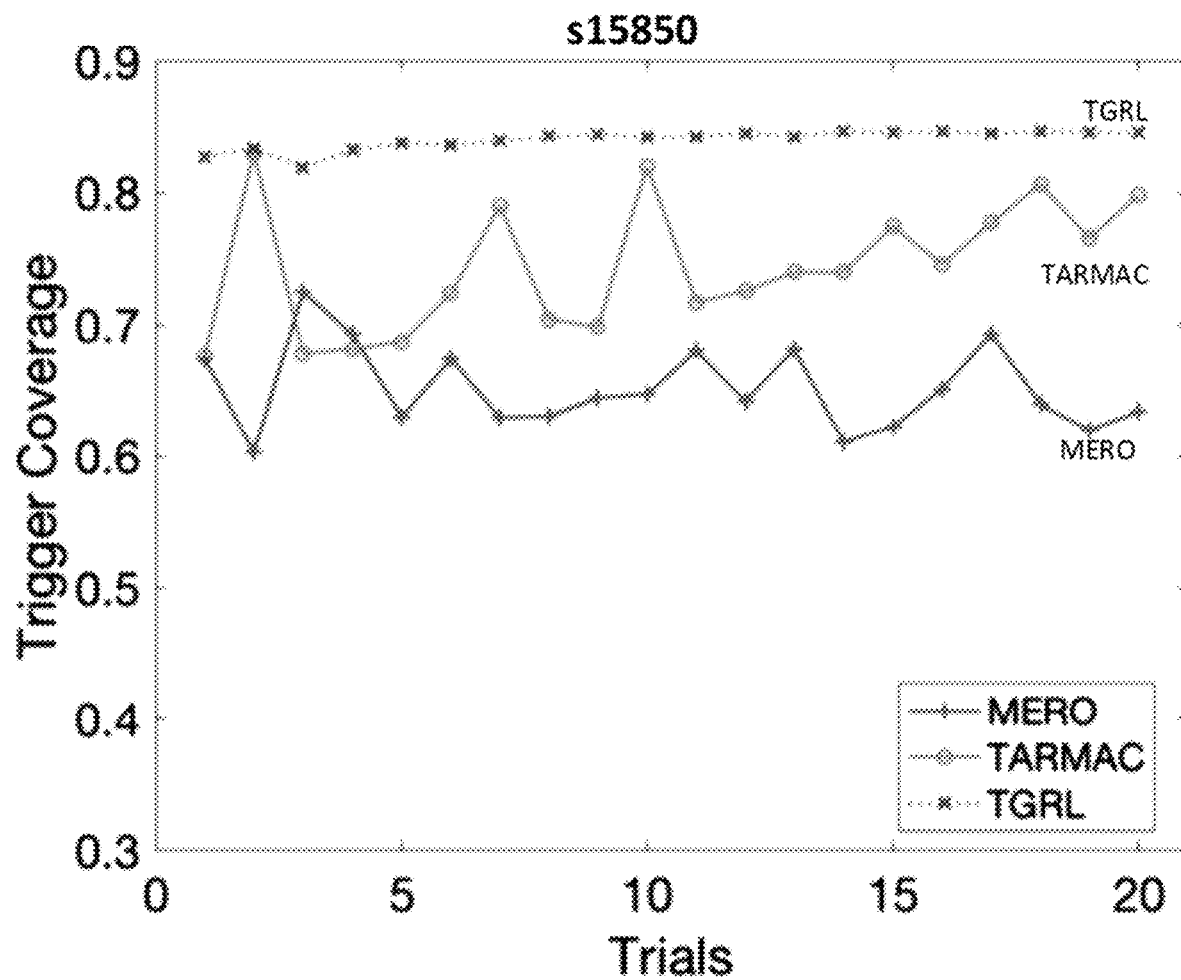

For example, in the cases of c6288 and c7552 with a comparable size, the trigger coverage drastically differs (86.1% versus 58.7%). Such a huge gap clearly indicates TARMAC's instability with respect to various benchmarks. In contrast, the TGRL approach achieves 100% trigger coverage for the first three benchmarks. When large designs are considered, the TGRL approach still maintains a high trigger coverage. Overall, the exemplary TGRL approach outperforms both MERO (up to 92.4%, 77.1% on average) and TARMAC (up to 38.6%, 14.5% on average) in trigger coverage. Table 1 (FIG. 7A) also reveals the weakness of previous works in terms of "stability" in trigger coverage. To confirm this observation, the stability of all approaches was evaluated. As such, c7552 and s15850 were chosen as target benchmarks, where each approach for 20 trials was reported and the trigger coverage was recorded, in order to study the extent of variations. The results are shown in FIGS. 8A and 8B for the c7552 and s15850 benchmarks. As can be seen from the figures, the TGRL method preserves stable performance across 20 trials. However, there are drastic variations in trigger coverage for the other two approaches, especially when applied to a larger benchmark like s15850. Correspondingly, the standard deviation of TARMAC is high (0.1876), while it is negligible for the TGRL method (0.0237). In reality, a stable performance is desirable, otherwise a user needs to try numerous times to obtain an acceptable result, which can be infeasible for Trojan detection in large designs.

Next, Table 2 (FIG. 7B) compares the test generation time for the three methods. The first column of the table lists the benchmarks, and the next three columns provide the test generation time for MERO, TARMAC, and the TGRL approach, respectively. The last two columns show the time improvement provided by the TGRL approach compared to the other methods.

Clearly, the TGRL approach provides the best results across the benchmarks, while MERO provides the worst results. Not surprisingly, MERO lags far behind the other two in time efficiency due to its brute-force bit-flipping method. While TARMAC provides better test generation time than MERO, the TGRL approach is significantly faster (6.54× on average) than TARMAC. In particular, there are three major bottlenecks that slow down TARMAC. First, TARMAC requires an extra transformation to map the circuit design into a satisfiability graph. Next, the clique sampling in TARMAC is compute-intensive as it repeatedly removes nodes from circuit and re-computes a logic expression for each potential trigger signal. Finally, TARMAC exploits an SMT solver to generate each candidate test vector, which determines the upper-bound of its time efficiency. In contrast, the TGRL approach does not use any satisfiability solver. As such, the only overhead in the TGRL approach is the training time—e.g., the RL model training is composed of 500 iterations where each iteration is basically a one-step test mutation and evaluation. When the model is well-trained, the RL model can automatically generate all the remaining test vectors without extra efforts. It is noted that the reported test generation time includes the model training time. Overall, the TGRL approach drastically improves the test generation time (up to 16.6×, 6.54× on average) compared to the state-of-the-art methods.

In brief, the detection of hardware Trojans is an emerging and urgent need to address semiconductor supply chain vulnerabilities. While there are promising test generation techniques, they are generally not useful in practice due to their inherent fundamental limitations, such as not being able to provide reasonable trigger coverage. Most importantly, existing test generation techniques require long test generation time and still provide unstable performance. To address these serious challenges, the present disclosures provides automated test generation systems and methods using reinforcement learning (TGRL) for effective hardware Trojan detection. Accordingly, the present disclosure has made several important contributions. For example, an exemplary TGRL method utilizes an efficient combination of attributes involving the rareness of signals and testability to provide a fresh perspective on improving the coverage of suspicious signals. Further, an exemplary TGRL method can utilize a reinforcement learning model trained with stochastic methods to drastically reduce the test generation time. Experimental results demonstrated that such an approach can drastically reduce the test generation time (6.54× on average) while being able to detect a vast majority of the Trojans in all benchmarks (96% on average), which is a significant improvement (14.5% on average) compared to state-of-the-art methods.

Figure 9:
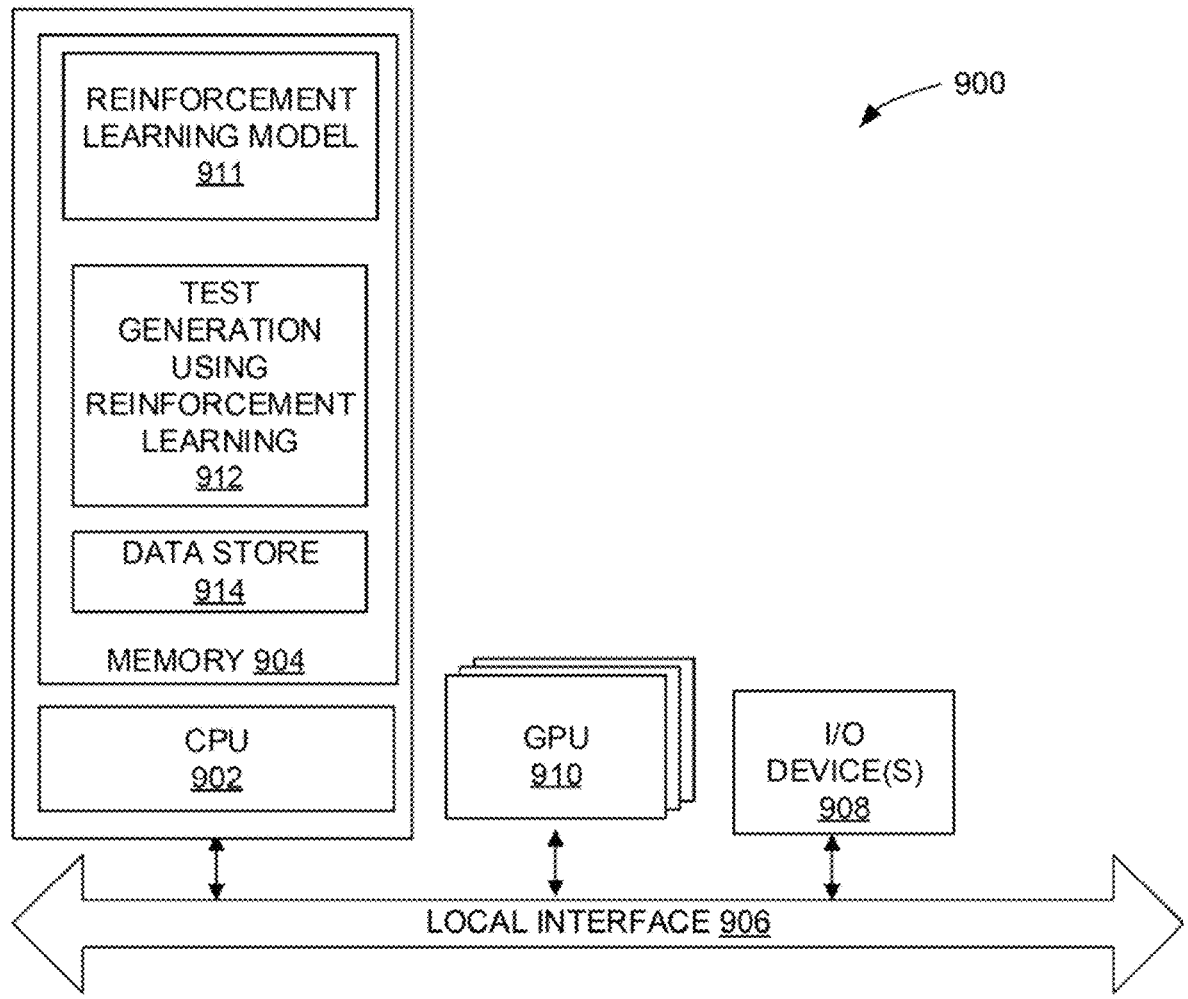
FIG. 9 depicts a schematic block diagram of a computing device that can be used to implement various embodiments of the present disclosure.

FIG. 9 depicts a schematic block diagram of a computing device 900 that can be used to implement various embodiments of the present disclosure. An exemplary computing device 900 includes at least one processor circuit, for example, having a processor 902 and a memory 904, both of which are coupled to a local interface 906, and one or more input and output (I/O) devices 908. The local interface 906 may comprise, for example, a data bus with an accompanying address/control bus or other bus structure as can be appreciated. The computing device 900 further includes Graphical Processing Unit(s) (GPU) 910 that are coupled to the local interface 906 and may utilize memory 904 and/or may have its own dedicated memory. The CPU and/or GPU(s) can perform any of the various operations described herein.

Stored in the memory 904 are both data and several components that are executable by the processor 902. In particular, stored in the memory 904 and executable by the processor 902 are code for implementing machine learning utilizing a reinforcement learning model 911 and implementing Test Generation using Reinforcement Learning (TGRL) algorithms or code 912. Also stored in the memory 904 may be a data store 914 and other data. The data store 914 data related to the computations performed by the reinforcement learning model 911 and/or the Test Generation using Reinforcement Learning (TGRL) algorithms 912. In addition, an operating system may be stored in the memory 904 and executable by the processor 902. The I/O devices 908 may include input devices, for example but not limited to, a keyboard, mouse, etc. Furthermore, the I/O devices 908 may also include output devices, for example but not limited to, a printer, display, etc.

Embodiments of the present disclosure can be implemented in hardware, software, firmware, or a combination thereof. In an exemplary embodiment, TGRL logic or functionality is implemented in software or firmware that is stored in a memory and that is executed by a suitable instruction execution system. If implemented in hardware, as in an alternative embodiment, TGRL logic or functionality can be implemented with any or a combination of the following technologies, which are all well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

It should be emphasized that the above-described embodiments are merely possible examples of implementations, merely set forth for a clear understanding of the principles of the present disclosure. Many variations and modifications may be made to the above-described embodiment(s) without departing substantially from the principles of the present disclosure. All such modifications and variations are intended to be included herein within the scope of this disclosure.

The invention claimed is:

1. A method for test pattern generation to detect a hardware Trojan comprising:
    determining, by a computing device, a set of initial test patterns to activate the hardware Trojan within an integrated circuit design;
    evaluating, by the computing device, nodes of the integrated circuit design and assigning a rareness attribute value and a testability attribute value associated with respective nodes of the integrated circuit design; and
    generating, by the computing device, a set of additional test patterns to activate the hardware Trojan within the integrated circuit design using a reinforcement learning model, wherein the set of initial test patterns is applied as an input to the reinforcement learning model along with rareness attribute values and testability attribute values associated with the nodes of the integrated circuit, wherein the reinforcement learning model is trained with a stochastic learning scheme to increase a probability of triggering one or more hardware Trojans in the integrated circuit design and identify optimal test patterns for triggering nodes of the integrated circuit design based on a combination of the rareness attribute values and the testability attributes values associated with the triggered nodes of the integrated circuit design.

2. The method of claim 1, wherein the rareness attribute value quantifies a level at which an output signal at a respective node is likely to be activated in response to an input signal.

3. The method of claim 2, wherein the rareness attribute is measured using a dynamic simulation of the integrated circuit design.

4. The method of claim 1, wherein the testability attribute quantifies a controllability level for the respective node that corresponds to a number of input signals that can be manipulated to set a target value at an output of the respective node and/or an observability level for the respective node corresponding to a number of input signals that can be manipulated to observe a target value at an output of the respective node.

5. The method of claim 4, wherein the testability attribute is measured using a Sandia Controllability/Observability Analysis Program (SCOAP).

6. The method of claim 1, wherein each of the additional test patterns is configured to activate a different set of rare nodes in the integrated circuit design.

7. The method of claim 1, wherein the determining operation further comprises accepting a netlist for the integrated circuit design and a required number of test patterns to be generated, wherein the reinforcement learning model starts with the initial test patterns and continuously generates a set of additional test patterns until the required number of test patterns are obtained, wherein the netlist identifies the nodes of the integrated circuit design.

8. The method of claim 1, wherein the reinforcement learning model adjusts bit values of the additional test patterns based on a probability distribution table, wherein the probability distribution table is adjusted based on feedback applied to the reinforcement learning model.

9. A system for test pattern generation to detect a hardware Trojan using delay-based analysis, the system comprising:
    a processor; and
    a tangible, non-transitory memory configured to communicate with the processor, the tangible, non-transitory memory having instructions stored thereon that, in response to execution by the processor, cause the processor to perform operations comprising:
        determining a set of initial test patterns to activate the hardware Trojan within an integrated circuit design;
        evaluating nodes of the integrated circuit design and assigning a rareness attribute value and a testability attribute value associated with respective nodes of the integrated circuit design; and
        generating a set of additional test patterns to activate the hardware Trojan within the integrated circuit design using a reinforcement learning model, wherein the set of initial test patterns is applied as an input to the reinforcement learning model along with rareness attribute values and testability attribute values associated with the nodes of the integrated circuit, wherein the reinforcement learning model is trained with a stochastic learning scheme to increase a probability of triggering one or more hardware Trojans in the integrated circuit design and identify optimal test patterns for triggering nodes of the integrated circuit design based on a combination of the rareness attribute values and the testability attributes values associated with the triggered nodes of the integrated circuit design.

10. The system of claim 9, wherein the rareness attribute value quantifies a level at which an output signal at a respective node is likely to be activated in response to an input signal.

11. The system of claim 10, wherein the rareness attribute is measured using a dynamic simulation of the integrated circuit design.

12. The system of claim 9, wherein the testability attribute quantifies a controllability level for the respective node that corresponds to a number of input signals that can be manipulated to set a target value at an output of the respective node and/or an observability level for the respective node corresponding to a number of input signals that can be manipulated to observe a target value at an output of the respective node.

13. The system of claim 12, wherein the testability attribute is measured using a Sandia Controllability/Observability Analysis Program (SCOAP).

14. The system of claim 9, wherein each of the additional test patterns is configured to activate a different set of rare nodes in the integrated circuit design.

15. The system of claim 9, wherein the determining operation further comprises accepting a netlist for the integrated circuit design and a required number of test patterns to be generated, wherein the reinforcement learning model starts with the initial test patterns and continuously generates a set of additional test patterns until the required number of test patterns are obtained, wherein the netlist identifies the nodes of the integrated circuit design.

16. The system of claim 9, wherein the reinforcement learning model is configured to adjust bit values of the additional test patterns based on a probability distribution table, wherein the probability distribution table is adjusted based on feedback applied to the reinforcement learning model.

17. A non-transitory, tangible computer readable medium having instructions stored thereon that, in response to execution by a processor in a computing device, cause the computing device to be capable of performing operations comprising:

determining a set of initial test patterns to activate a hardware Trojan within an integrated circuit design using a dynamic simulation of the integrated circuit design;

evaluating nodes of the integrated circuit design and assigning a rareness attribute value and a testability attribute value associated with respective nodes of the integrated circuit design; and generating a set of additional test patterns to activate the hardware Trojan within the integrated circuit design using a reinforcement learning model, wherein the set of initial test patterns is applied as an input to the reinforcement learning model along with rareness attribute values and testability attribute values associated with the nodes of the integrated circuit, wherein the reinforcement learning model is trained with a stochastic learning scheme to increase a probability of triggering one or more hardware Trojans in the integrated circuit design and identify optimal test patterns for triggering nodes of the integrated circuit design based on a combination of the rareness attribute values and the testability attributes values associated with the triggered nodes of the integrated circuit design.

18. The computer readable medium of claim 17, wherein the rareness attribute value quantifies a level at which an output signal at a respective node is likely to be activated in response to an input signal, wherein the testability attribute quantifies a controllability level for the respective node that corresponds to a number of input signals that can be manipulated to set a target value at an output of the respective node and/or an observability level for the respective node corresponding to a number of input signals that can be manipulated to observe a target value at an output of the respective node.

19. The computer readable medium of claim 17, wherein the determining operation further comprises accepting a netlist for the integrated circuit design and a required number of test patterns to be generated, wherein the reinforcement learning model starts with the initial test patterns and continuously generates a set of additional test patterns until the required number of test patterns are obtained, wherein the netlist identifies the nodes of the integrated circuit design.

20. The computer readable medium of claim 17, wherein the reinforcement learning model is configured to adjust bit values of the additional test patterns based on a probability distribution table, wherein the probability distribution table is adjusted based on feedback applied to the reinforcement learning model.

* * * * *